UNITED STATES PATENT OFFICE.

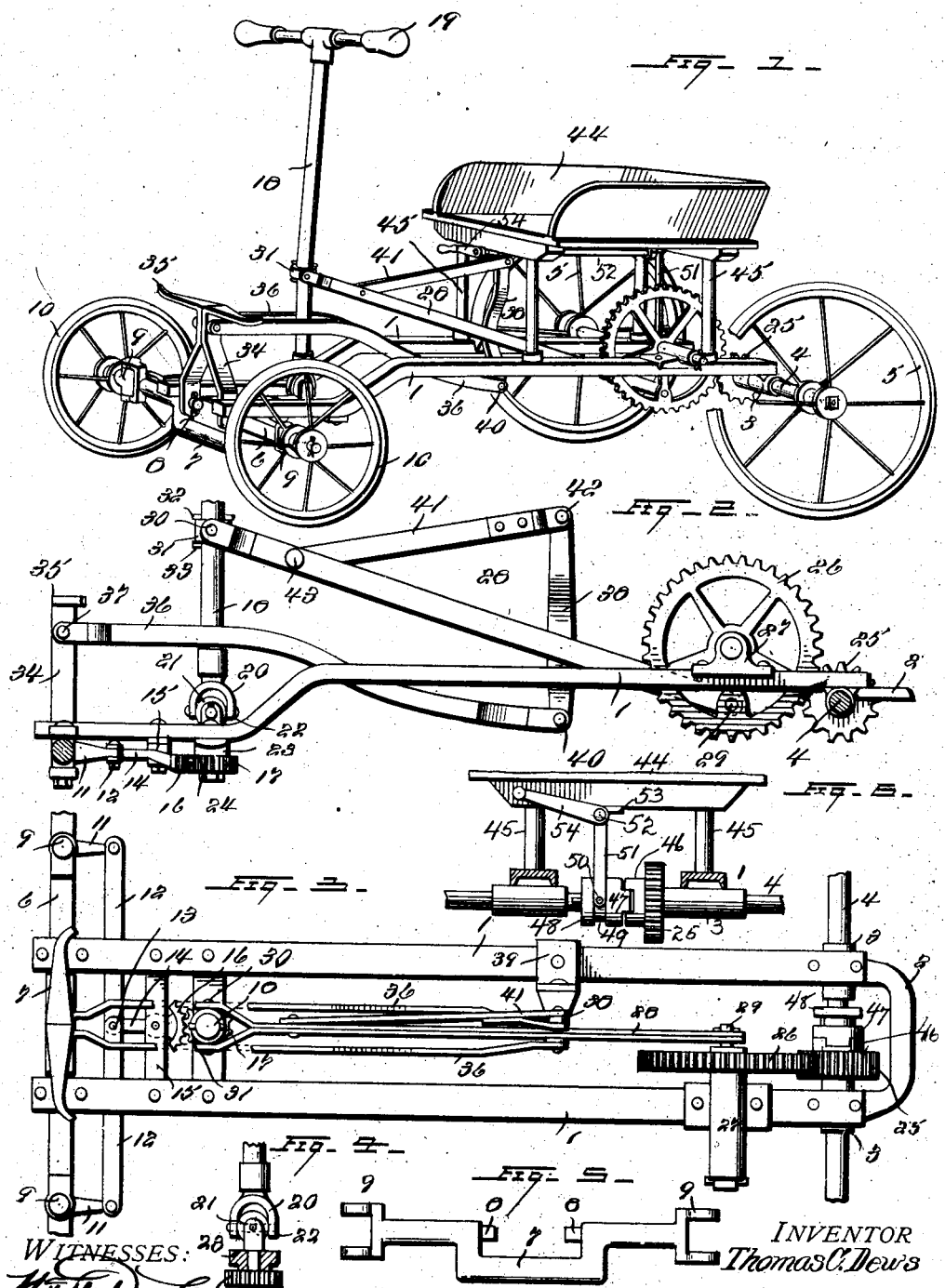

THOMAS C. DEWS, OF ALEXANDRIA, INDIANA.

WAGON.

No. 834,368.  Specification of Letters Patent.  Patented Oct. 30, 1906.

Application filed October 31, 1905. Serial No. 285,340.

*To all whom it may concern:*

Be it known that I, THOMAS C. DEWS, a citizen of the United States, residing at Alexandria, in the county of Madison, State of Indiana, have invented certain new and useful Improvements in Wagons, of which the following is a specification, reference being had therein to the accompanying drawings.

This invention relates to a wagon, and particularly to a polycycle structure adapted to be driven by both the hands and feet or by either of these members.

The invention has for an object to provide a driving-gear having a combined operating and steering handle connected with a foot-lever by which means power from both the hands and feet may be applied to operate a single driving mechanism and a steering of the wagon permitted by a rotation of the operating-handle through the improved mechanism hereinafter described.

Other and further objects and advantages of the invention will be hereinafter fully set forth, and the novel features thereof defined in the appended claims.

In the drawings, Figure 1 is a perspective of the invention. Fig. 2 is an enlarged elevation of the driving mechanism thereof. Fig. 3 is a plan of this mechanism. Fig. 4 is a sectional detail of the steering-gear. Fig. 5 is a detail elevation of a portion of the front axle, and Fig. 6 is a similar view of the clutch device.

Like numerals of reference refer to like parts throughout the several views of the drawings.

The numeral 1 designates the main frame of the machine, which is preferably composed of parallel members connected together at the rear by the yoke 2 and provided with bearing-boxes 3 for the rear axle 4, which carries the wheels 5 at its opposite ends. The front axle 6 is rigidly connected to the frame and provided intermediate of its ends with a drop portion 7 and having stub-axles 8, extended in line with the ends of the axle, to provide bearings for the foot-lever to be hereinafter described. At the opposite ends of the axle 6 knuckle-bearings 9 are provided for pivotally mounting the front steering-wheels 10 in the usual manner. These bearings are provided with rearwardly-extending arms 11 for operating the wheels, and the arms are connected by links 12, pivoted together at 13, where they are pivotally connected to one end of the lever 14, which is pivotally mounted upon the cross-bar 15 and provided at its opposite end with a gear-sector 16, adapted to engage the pinion 17, carried by the lower end of the hand-lever 18. This hand-lever is provided at its upper end with handle-bars 19, of any suitable construction, and at its lower end with the pivoting-yoke 20, carrying a bearing-box 21, which is also pivoted in the ears 22, carried by the post 23, which is pivotally mounted in the cross-bar 24 and carries at its lower end the steering-gear 17, as shown in Fig. 4. This mounting of the hand-lever permits its free rotation for the purpose of steering the wagon and also its oscillation for the operation of the driving mechanism. This driving mechanism consists of a pinion 25, mounted upon the rear axle and meshing with the gear 26, mounted in the elongated bearing-box 27, carried upon one of the frame-bars 1. From the gear 26 a pitman 28 extends to the hand-operating lever and is pivotally connected with the gear 29 and at 30 with the collar 31, mounted upon the lever 18 to permit free rotation of the lever thereon. This collar is held against vertical movement on the lever by means of pins or other projections 32 and 33, disposed above and below the collar, as shown in Fig. 2.

For the purpose of providing means by which the driving mechanism for the wagon may be disconnected or thrown out of gear as to permit the movement of the wagon without the operation of the handle-bar or foot-rest whenever desired—for instance, when coasting—a clutch mechanism is provided, as particularly shown in Fig. 6. The gear 25, disposed upon the rear axle 4, is loosely mounted thereon and is provided with a clutch-face 46 upon its hub adapted to coöperate with a similar face 47, carried upon the sliding clutch 48, which is splined upon the shaft 4, or otherwise held thereon, so as to rotate therewith, yet be capable of longitudinal movement thereon. This clutch member is provided with a circumferential groove 49, into which the lower end 50 of the clutch-lever 51 extends. This clutch-lever may be mounted in any desired manner—for instance, at one end of the rock-shaft 52, which is carried by suitable bearings 53, disposed upon the under surface of the seat portion 44. The forward end of this rock-shaft is provided with an operating-lever 54, the oscillation of which communicates motion to the clutch-lever, so as to shift the clutch toward and from the hub of the driving-gear. With the parts in the position shown in Fig. 6 the gear is clutched in driving relation, so that the power from the foot and hand driving mechanism is communicated to the rear axle of the wagon. It will be seen that a slight upward movement of the operating-lever 54 will shift the clutch out of engagement with the hub of the gear, thus disconnecting it from the rear shaft when desired.

The foot driving connection comprises the forked lever 34, the lower ends of which are pivotally mounted upon the bearings 8 of the front axle and the upper end of which is provided with the foot-rest 35. Adjacent to this foot-rest a pitman 36 is pivotally connected at 37 and at its opposite end pivoted to a rock-lever 38, mounted upon one of the side bars by means of an inwardly-projecting bracket, as shown at 39 in Fig. 3. The pitman 36 is composed of parallel separated members which pass at opposite sides of the hand-lever and thence downward and join, where they are pivoted at 40 to the lower end of the lever 38. At the upper end of the rock-lever 38 a connecting-link 41 is pivotally connected thereto at 42 and pivotally connected at its opposite end 43 to the pitman extending from the hand-lever to the gear. Any desired form of seat for the operator may be provided. For instance, as shown in Fig. 1, a seat 44 may be mounted upon a series of posts 45 carried by the frame-bars 1. As shown in Figs. 1 and 2, these bars are depressed into a lower horizontal plane at the front end than at the rear thereof, so as to properly position the foot-lever relatively to the height of the seat, while the connecting-pitmen and rock-shaft are also deflected so as to allow their free travel without interference.

In the operation of the invention it will be seen that the hand and foot levers move alternately toward and from each other, thus producing the most efficient driving motion and securing the maximum of power from the muscular action of the limbs.

It will also be apparent that the wagon may be operated entirely by hand or by the feet—for instance, in the case of children or persons unable to use either of their limbs for any reason. This hand operating-lever, through the connections herein described, is adapted to permit direct steering action during the driving of the machine—that is, the steering-wheels are turned in the same direction as the handle by a partial rotation thereof. The invention therefore presents a construction in which a maximum of power may be applied to the driving-gear of a wagon by the use of both the hands and feet connected to a single mechanism and the use of a plurality of driving devices upon a single shaft obviated, so that the power applied will produce a greater speed and can be more freely controlled than under other conditions.

Having now described my invention and set forth its merits, what I claim, and desire to secure by Letters Patent, is—

1. In a wagon, a driving mechanism applied to one of the axles thereof, an oscillating hand operating-lever, a pitman extending from said hand operating-lever to said driving mechanism, an oscillating foot operating-lever, a rock-lever, a pitman connection from the foot-lever thereto, and a link from said rock-lever to the pitman of the hand-lever.

2. In a wagon, a driving mechanism applied to one of the axles thereof, an oscillating hand operating-lever, a pitman extending from said hand operating-lever to said driving mechanism, an oscillating foot operating-lever, a rock-lever, a pitman connection from the foot-lever thereto, a link from said rock-lever to the pitman of the hand-lever, a steering mechanism carried by the lower end of said hand-lever, and a rotatable connection between the hand-lever and its pitman.

3. In a wagon, a driving mechanism applied to one of the axles thereof, an oscillating hand operating-lever, a pitman extending from said hand operating-lever to said driving mechanism, an oscillating foot operating-lever, and a rock-lever connected to both the foot-lever and the pitman.

4. In a wagon, a frame comprising parallel members, bearings depending from the rear end of said members, an axle mounted in said bearings and provided with a driving-pinion thereon, a bearing secured to the upper face of one of said members, a driving-gear mounted in said bearing, an oscillatory hand-lever pivotally connected with said driving-gear, a front axle secured rigidly to said members, steering-wheels pivotally mounted at the opposite ends of said front axle, a connection between said steering-wheels and said hand-lever, a foot-lever pivotally mounted at the front of said members, pitman-bars extending at opposite sides of said hand-lever and pivotally connected to said foot-lever, a vertically-disposed rock-lever pivoted to said pitman members, and means for connecting said rock-lever with the hand-lever.

5. In a wagon, a frame, a front axle provided with a depending U-shaped portion, bearings at the opposite sides of the U-shaped portion, and an operating-lever pivotally mounted upon said bearings.

6. In a wagon, a frame provided with an axle, a seat above said axle, a driving-gear loosely mounted thereon, a driving mechanism operatively connected with said gear, a clutch-face upon the hub of said gear, a clutch member slidably mounted upon said axle and provided with a face to engage said gear-clutch, and a rock-shaft mounted upon said seat and provided with a lever for shifting said clutch member.

7. In a wagon, a frame having an axle, a driving-gear loosely mounted thereon, a clutch slidably mounted upon said axle to coöperate with said gear, a rock-shaft horizontally disposed above said clutch, a depending lever from said rock-shaft engaging said clutch, and an operating-lever carried by said rock-shaft.

In testimony whereof I affix my signature in presence of two witnesses.

THOMAS C. DEWS.

Witnesses:
  OTIS MOORE,
  FRANK LODER.